June 20, 1939.  B. J. WEST  2,162,985
WINDSHIELD CLEANING DEVICE
Filed March 12, 1934
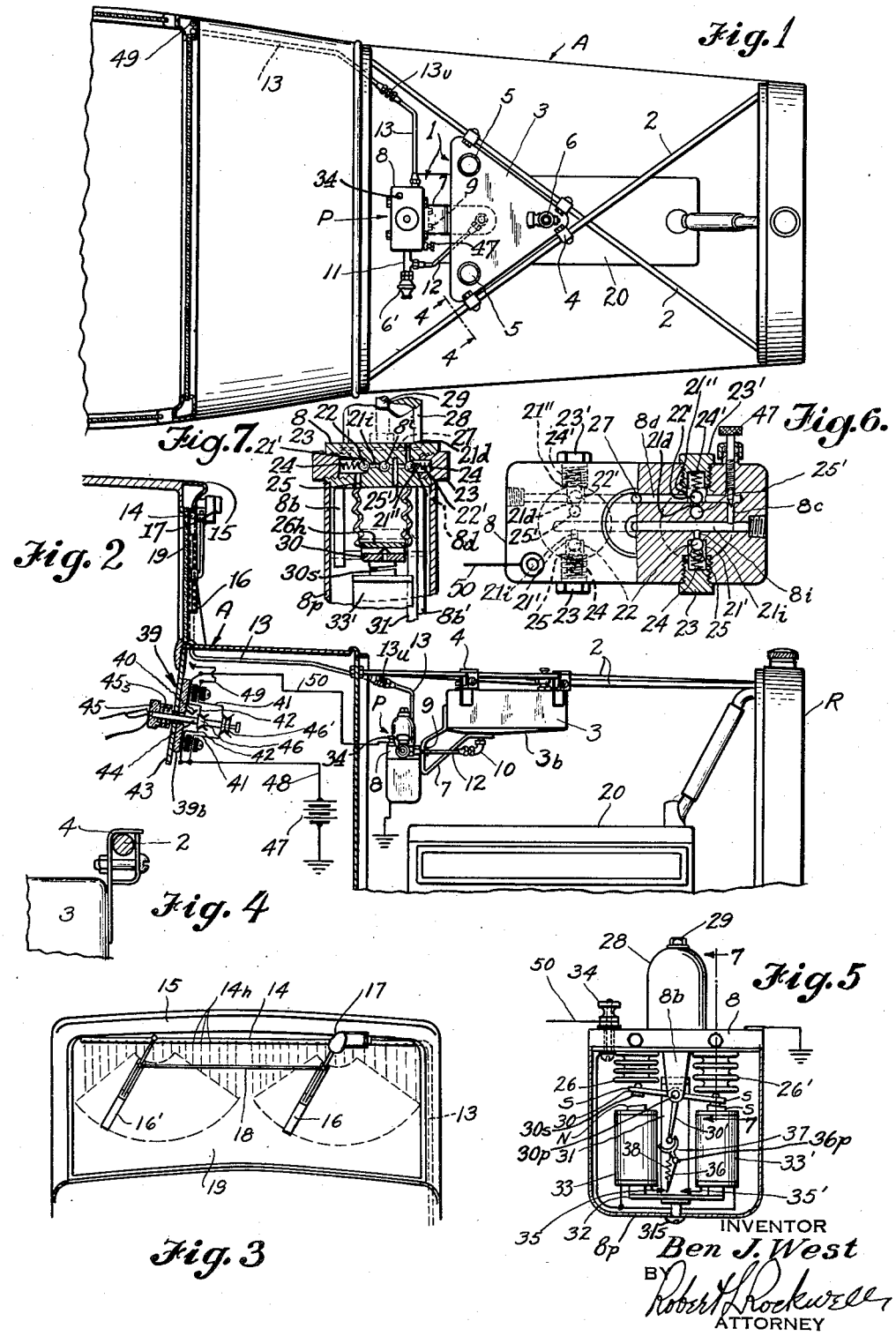
INVENTOR
Ben J. West
BY Robert Rockwell
ATTORNEY Patented June 20, 1939

2,162,985

UNITED STATES PATENT OFFICE 2,162,985

WINDSHIELD CLEANING DEVICE

Ben J. West, Puyallup, Wash.

Application March 12, 1934, Serial No. 715,062

4 Claims. (Cl. 15—250)

This invention relates to devices for cleaning transparent windshields in general, and particularly to a device adapted to clean the windshields of automotive vehicles under extremely unfavorable operating conditions.

My invention is in the nature of an improvement upon the invention set forth in my U. S. Patent No. 1,973,939, issued September 18, 1934, and resides in novel means for spraying a substantial width of the windshield with a pulsating spray of a cleaning fluid in cooperative combination with wiping means for cleaning said windshield while being so sprayed, the operation of said spraying means being subject to the control of the operator by the simple expedient of closing or opening a conveniently positioned electric switch.

Heretofore, the windshield cleaners or swipes employed to maintain a clear space through which the drivers of automotive and other vehicles could see during rain and dry snow storms, have been rendered more or less ineffective in heavy damp snow storms and when a period of comparatively low humidity and low temperature is followed by fog, a high humidity condition or a cold light rain. In the first instance the heavy damp snow sticks to the windshield and soon prevents said swipes from operating, and in the second instance the cold glass frosts over so rapidly that the swipe is unable to remove it. Furthermore, when driving through muddy roads after a rain, the windshield may become splattered with mud, and when driving through dust storms it becomes coated with a film of dust, and when driving through areas infested with flying bugs and other insects these often burst open upon impact with the windshield and smear the same in the critical line of vision. In each of above cases with insufficient atmospheric moisture, the windshield swipe simply spreads without removing the smear, and the driver is forced to stop and clean the windshield by hand. While doing so, there is considerable risk of other vehicles colliding with the stopped machine because of impaired visibility caused by the aforesaid conditions.

An investigation of the records of the motor divisions of the police departments of the principal cities of the world, such as New York, Paris, London and Chicago, has disclosed the fact that between ten and fifteen percent of the automobile accidents of record are traceable to faulty windshield visibility due to the aforesaid conditions.

One of the objects of my invention is to provide a device that will automatically spray the windshield of an automobile or other means of transportation with a warm cleansing liquid in cooperative relation with a wiping or swipe type of windshield cleaner, said spray being of a pulsating character.

A further object is to provide a device of the kind described in which electromagnetic impulse pump means and a storage tank for a cleansing fluid are combined to form a compact operating unit that may be remotely controlled in combination with electrically operated swipe means through the intermediacy of a conveniently positioned combination electric switch.

A still further object is to provide a device of the kind described in which provision is made to automatically drain the exposed portion of the discharge tube of the impulse pump after the device has been operated to spray the windshield.

A still further object is to provide a device of the kind described that is simple in construction, reliable in operation, and easy to install and maintain.

Other objects and advantages will be apparent from the following detailed description of a preferred form of the invention, which consists of certain parts and combination of parts, hereinafter described, illustrated in the accompanying drawing and embraced in the appended claims.

In the drawing:

Figure 1 is a plan view of the combined storage tank and pump unit as installed above the engine or motor of an automobile.

Fig. 2 is a side elevation of the same showing the course of the discharge tube and the positioning of the spray duct with reference to the windshield swipes, and a diagram of the electric circuit preferably employed.

Fig. 3 is a front elevation of the windshield portion of the body of the automobile showing one form of spray duct in operative combination with said swipes.

Fig. 4 is an enlarged detail of one of the support clamps of the storage tank, corresponding to a view taken on broken line 4—4 of Fig. 1.

Fig. 5 is a front elevation of the electromagnetic pump element to a larger scale looking toward the storage tank as shown in Fig. 2 with the removable housing in section.

Fig. 6 is a plan view of the pump element to a still larger scale with the air chamber removed and a section through one pair of the check valve units.

Fig. 7 is a fragmentary sectional elevation on broken line 7—7 of Fig. 5 showing particularly the inlet and outlet valve elements, ducts and apertures for one of the bellows elements of the impulse pump.

Like reference numerals are used to indicate like parts throughout the several views of the drawing.

The general arrangement of the combined tank and pump unit 1 supported by the radiator brace rods 2 of an automobile A, is shown in Figs. 1 and 2. The tank 3 may be triangular in plan with a bulging bottom 3b and supplied with support clamps 4, which are adapted to facilitate its attachment to or removal from brace rods 2.

The tank may be provided with a plurality of removable filler caps 5 so the tank may be filled conveniently from either side of the machine with a suitable liquid, which is warmed by means of the heat emanating from the engine and radiator R. A pet-cock 6 provides an adjustable vent that can be opened readily when it is desired to drain the tank.

A bracket 7 may be fixedly secured to one side and the bottom of the tank, as shown clearly in Fig. 2, to provide a strong yet light support for an electromagnet impulse pump P, the head block 8 of which is removably secured thereto by means of cap screws 9. An elbow fitting 10 in the tank and a T 11 in the inlet opening of the pump, secure the ends of tube 12 connecting the pump with the tank. Another petcock 6' is connected to one end of said T to facilitate draining the tank and inlet duct 8i of the pump.

The discharge or outlet duct 8d of the pump is connected by means of a suitable fitting to discharge tube 13, which in turn connects with the horizontally disposed spray duct 14. Said spray duct is provided with a plurality of small apertures 14h and is preferably fixedly secured to the car top 15 above both swipe 16 of windshield cleaner 17 and auxiliary swipe 16' operated thereby by means of connecting link 18, as shown in Fig. 3. Said apertures 14h are preferably slanted inwardly toward transparent windshield 19 so the spray therefrom will be sure to impinge on the width of windshield above the swipes when the car is moving at slow speeds. A union 13u may be inserted in the discharge line, as shown in Figs. 1 and 2. When this is done and it is desired to remove the tank and pump assembly to facilitate work on engine 20 of the car, it is convenient to break the discharge line at said union so as to reduce the length of tube that might interfere with said work.

It will be apparent that the top of the pump is at a lower level than the bottom of the tank, hence the fluid therefrom flows by virtue of gravitational force into inlet duct 8i in the head block of said pump. Referring to Fig. 6, it will be seen that said head block is provided with a pair of apertures each having an inner portion of small diameter 21i connecting with inlet duct 8i, a portion of larger diameter 21' containing a ball valve 22, and another portion of still larger diameter threaded to receive a hexagonal-head screw 23, recessed to receive compression spring 24, which forces said ball against the valve seat formed at the inner end of the portion 21' of the aperture. Said head block also contains a pair of small apertures 25 which connect each said portion 21' with the interior of one of a pair of corrugated bellows elements 26 and 26', which may be made of thin resilient metal which tends to return them to their normally extended position illustrated by bellows element 26' in Fig. 5. The upper ends of said bellows are secured to said head block and their lower ends are closed with light yet stiff discs or heads 26h.

A pair of discharge valves of similar construction comprising balls 22', springs 24' and recessed screws 23', are provided in the opposite side of the head block. In this case, however, the smallest portion of each head block aperture 21d connects directly with one of the metallic bellows by means of an aperture 25', and the larger portion 21'' of said head block aperture is connected directly with discharge duct 8d, to which tube 13 is connected as previously described. An aperture 27 connects said discharge duct to an air chamber 28 removably secured to the head block by means of screw 29. The amount of air in said air chamber may be reduced to secure the best pulsating effect of the spray by loosening screw 29 slightly while the pump is operating, thereby allowing a portion of the air to escape, after which said screw is again tightened.

An armature 30 of magnetic material, provided with a downwardly projecting arm 30', stop pieces 30s and pivot pin 30p, preferably of non-magnetic material, is pivotally supported on said pin between a pair of brackets 8b and 8b' which may be made a part of the head block. A suitable U-bar 31 of magnetic material, having an aperture through which pivot pin 30p of armature 30 may pass, is fixedly secured to the head block by means of bracket 8b' so one of its legs is adjacent the mid-portion of said armature. A yoke 32, also of magnetic material, is fixedly secured to the other leg of said U-bar, and a pair of electromagnets 33 and 33' are fixedly secured to said yoke, thereby providing poles opposite the ends of the aforesaid armature.

The magnets preferably are wound in the same direction, one end of their respective windings being connected to an insulated terminal screw 34, and the other end thereof being connected respectively to insulated adjustable contacts 35 and 35' adapted to make connection alternately with contact arm 36, pivotally mounted jointly with yoke arm 37 on pivot pin 36p fixedly secured to U-bar 31. A tension spring 38, connected at its ends to said yoke and contact arms respectively, maintains connection with said contacts alternately. It will be noted that said contact arm constitutes a "ground" connection for the magnet winding connected thereto. A removable cover 8p, held in position by means of screw 31s engaging U-bar 31, is used to enclose and protect the moving parts of the pump.

To facilitate the joint and separate control of the windshield spray and swipes, I have provided an electric switch, designated as a whole by the numeral 39, having a base of insulating material 39b on which are fixedly positioned in spaced apart relation two pairs of contact springs 41 and 42 respectively. The base of said switch is preferably mounted behind instrument panel 43 of the automobile with the end of rod 44 and appended knob 45 protruding from the face of said panel within convenient reach of the driver. A conical contact member 46 is fixedly secured to said rod, and a peripherally grooved cylindrical contact member 46' is slidably positioned on the smaller diameter end portion of said rod, at the end of which a small washer may be riveted to serve as a stop.

With the switch pushed inwardly by the driver's finger to the position shown, it will be apparent that current from the positive terminal of battery 47 may flow through conductor 48, contact springs 41, conductor 49, the motor of windshield swipe 17, thence through the metallic frame of the car back to the negative terminal of the battery, thereby driving said motor and actuating the windshield swipes. Likewise current from said positive terminal flows through conductor 48, contact springs 42, conductor 50 to the left electromagnet of the spray pump for the connections shown in Fig. 5, thence through the metallic frame of the car back to the negative terminal of the battery, thereby producing for example the magnetic polarities indicated in the aforesaid figure of the drawing. The resulting attraction and repulsion between said magnetic polarities rotate armature 30 about its pivotal support in a counterclockwise direction, thus allowing the left bellows shown in Fig. 5 to expand due to its structural elasticity and the force of the liquid in the tank. This opens the inlet and closes the outlet valves in communication with said bellows as the same is filled with the liquid. The aforesaid movement of said armature also compresses the right bellows, previously expanded and filled in like manner with liquid from the tank, thereby closing its inlet valve and opening its outlet valve to force some of the liquid into air chamber 28 and some through tubes 13, spray duct 14, and finally through small apertures 14h in the form of a spray which impinges against and across the top of the windshield above the windshield swipes, as shown clearly in Fig. 3.

The counterclockwise movement of armature 30 from the position shown in Fig. 5 causes arm 30' secured thereto to move in like direction and force yoke arm 37 in the opposite or clockwise direction about its pivotal support until spring 38 is carried past the center of said support 36p, whereupon said spring snaps contact arm 36 from contact 35 to contact 35', the proportion and adjustment of the parts being such that this change from one contact to the other occurs when the armature is at or near the end of its movement in either direction. In this way connection with magnet 33 is quickly transferred to magnet 33' thus energizing the latter and reversing the magnetic polarities indicated in Fig. 5, which then force the armature in a clockwise direction, thereby discharging the liquid from previously filled bellows 26 and allowing bellows 26' to again fill with the liquid from the tank as the armature returns to the position shown in Fig. 5. From the foregoing it will be clear that so long as contact springs 42 of switch 39 are connected, the warm liquid will be pumped from the tank onto the width of windshield above the swipes in the form of a pulsating spray, the air chamber being effective in reducing the intensity and slightly prolonging the time of the pulsations by utilizing the expansion of the air, compressed by the portion of the liquid previously forced into said chamber, to continue the spray discharge for a short interval of time at the end of each stroke of the pump.

It will be evident from the foregoing description that by means of my invention the pulsating spray is caused by the frequently recurring impulses of pressure produced automatically by the device without manipulative effort on the part of the operator, other than to actuate the control means used to start its operation.

I have discovered that when a pulsating spray of the kind described using a warm liquid is applied to the windshield in combination with the operation of the windshield swipes, a clear space may be maintained under the most unfavorable driving conditions, several of which have been previously described. The pulsations of the warm spray are found to penetrate quickly through the film tending to obscure the driver's vision, and the spray liquid provides the necessary moisture required to make the operation of the swipe fully effective in removing the film. Another advantage of the pulsating spray is that much less liquid is required to maintain clear vision conditions for a given period of time than when the usual type of spray is employed because of the pause at the end of each stroke of the pump, hence the tank does not need to be filled so frequently.

The effectiveness of the spray is increased by adding various percentages of an anti-freeze solution or of a chemical salt or combination of salts, especially in very cold weather. Furthermore, I find that a surprisingly small amount of such spray is required so long as the glass is kept well moistened by ejecting the spray at intervals as the need for it is seen.

In order to facilitate this mode of operation, it will be noted in Fig. 2 that the construction of switch 39 is such that when the finger is withdrawn from knob 45, rod 44 and conical contact 46 are forced outwardly from engagement with contact springs 42 by means of compression spring 45s, thereby opening the electromagnet pump circuit and stopping the spray; but peripherally grooved contact 46', being slidably positioned on the end portion of said rod, is not disengaged thereby from contact springs 41, hence the swipe motor continues to operate. Obviously the operation of spray pump may be controlled by this push button feature of the switch independently of the swipes, but cannot be left connected thoughtlessly by the driver. When it is desired to stop the swipes, knob 45 may be grasped between the thumb and finger and pulled outwardly, whereupon the stop at the end of rod 44 engages contact 46' and breaks its connection with contact springs 41, thus opening the swipe motor circuit; and spring 40 engages contact 46 thereby holding said rod and appended contacts 46 and 46' in the "open" position. The swipe motor may be started again by pushing knob 45 all the way in to the position shown in the aforesaid Fig. 2. This also closes the spray pump circuit momentarily, and if held in that position a few seconds, the spray will operate as previously described.

In very cold weather it is desirable to drain the spray tube automatically to prevent freezing, especially when the water does not contain an antifreeze chemical and the spray is not used frequently. I make provision for this by means of a small needle valve 47 in head block 8 of the pump. This valve controls the size of the opening between inlet duct 8i and discharge duct 8d through connecting duct 8c. By opening said valve slightly the liquid in the spray tube will drain more or less slowly back into the tank depending upon the size of opening thus provided, which may be made so small that its effect on the spray is negligible when the pump is operating. Any small particle of foreign matter that may become lodged in duct 8c usually can be cleared by opening and then again adjusting valve 47 while the pump is operating.

While I have illustrated and described my device in a preferred form as applied to automotive vehicles, it will be apparent to those skilled in the art that the combination of coacting elements constituting the invention may be adapted and applied to other window surfaces where it is important to maintain a clear area under unfavorable operating conditions, and that various changes may be made in the details of construction and in the positioning of the tank and pump, without departing from the purpose and intent of said invention within the scope of the appended claims.

What I claim as new and desire to protect by Letters Patent is:

1. In a mechanism unit for spraying a liquid onto the windshield of a vehicle, the combination of a tank containing a liquid, means for securing said tank to said vehicle, a pump having liquid inlet and discharge ducts, means for fastening and connecting said pump to said tank, a conduit extending above said tank and connecting with the discharge duct of said pump, and by-pass means connecting the inlet and discharge ducts of said pump to drain the liquid from said conduit back into said tank after said pump has ceased operating.

2. In means for spraying a liquid onto the windshield of a vehicle, the combination of a tank having means for securing the tank to said vehicle said tank containing a liquid, a pump having inlet and discharge ducts, means for fastening and connecting said pump to said tank, a conduit extending above said tank and connecting with the discharge duct of said pump, means providing a bypass between the inlet and discharge ducts of said pump, and valve means adapted to control the flow of liquid from said conduit through said bypass back into said tank after said pump has ceased operating.

3. In means for spraying a liquid onto the windshield of an automotive vehicle in cooperation with an electrically powered windshield swipe, the combination of a tank having means for removably securing the same to said vehicle and containing a liquid, an electromagnet impulse pump having fluid inlet and discharge ducts, means for fastening and connecting said pump to said tank so the liquid flows by gravitational force from said tank into the inlet duct of said pump, a source of electricity, conductor means connecting said source with said swipe and with said pump, and switch means in said conductor means whereby both swipe and pump are operated when pressure is applied to said switch means, but the swipe only is operated when said pressure is removed.

4. In means for spraying a liquid onto a windshield in cooperation with an electrically powered windshield swipe, the combination of a tank having means for securing the same to said vehicle and containing said liquid, an electrically powered pump having fluid inlet and discharge ducts, means for supporting said pump by and connecting its said inlet duct to said tank, a source of electricity, electrical conductor means for operatively connecting said source with said swipe and with said pump; and switch means in said conductor means adapted to connect both said swipe and said pump to said source when force is applied in one direction to said switch means, and adapted also to maintain connection only between said source and swipe when said pressure is subsequently removed, and adapted additionally to disconnect both said pump and said swipe from said source when force is applied to said switch means in the opposite direction.

BEN J. WEST.